United States Patent
Eigeles

(10) Patent No.: US 7,080,409 B2
(45) Date of Patent: Jul. 18, 2006

(54) METHOD FOR DEPLOYMENT OF A WORKABLE PUBLIC KEY INFRASTRUCTURE

(76) Inventor: Dan Eigeles, 47 Moshe Goshen Avenue, Kiryat Motzkin 26313 (IL)

( * ) Notice: Subject to any disclaimer, the term of this patent is extended or adjusted under 35 U.S.C. 154(b) by 924 days.

(21) Appl. No.: 10/121,939

(22) Filed: Apr. 10, 2002

(65) Prior Publication Data

US 2002/0152376 A1 Oct. 17, 2002

Related U.S. Application Data

(63) Continuation-in-part of application No. 09/189,180, filed on Nov. 10, 1998, now Pat. No. 6,401,203.

(30) Foreign Application Priority Data

Nov. 10, 1998 (IL) .................................. 122254

(51) Int. Cl.
*G06F 17/30* (2006.01)
(52) U.S. Cl. .................. 726/28; 726/27; 713/182; 713/183; 713/185
(58) Field of Classification Search .............. 726/4, 726/5, 21, 27, 28; 713/182, 183, 185; 705/26, 705/75
See application file for complete search history.

(56) References Cited

U.S. PATENT DOCUMENTS

| 5,164,988 | A | | 11/1992 | Matyas et al. ............... 380/25 |
| 5,778,072 | A | | 7/1998 | Samar ....................... 380/30 |
| 6,167,518 | A | * | 12/2000 | Padgett et al. ............. 713/186 |
| 6,192,131 | B1 | | 2/2001 | Geer, Jr. et al. ............. 380/283 |
| 2002/0083008 | A1 | * | 6/2002 | Smith et al. ................. 705/64 |
| 2004/0162984 | A1 | * | 8/2004 | Freeman et al. ............. 713/175 |

FOREIGN PATENT DOCUMENTS

| EP | 0 942 568 A2 | 9/1999 |
| WO | WO 96 02993 A2 | 2/1996 |
| WO | WO 99 34551 A1 | 7/1999 |
| WO | WO 01 31841 A1 | 5/2001 |

OTHER PUBLICATIONS

Ellison et al. "Ten Risks of PKI: what you're not being told about Public Key Infrastructure." Computer Security Institute, vol. XVI, No. 1, pp. 1-5, Winter 2000.
Guida "Experts debate pros and cons of PKI Rebuttal on Ten Risks of PKI," Computer Security Alert, No. 204, pp. 1-3, Mar. 2000.
Kent "PKI Debate ranges on Rebuttal to Ten Risks of PKI," Computer Security Alert, No. 206, pp. 1-3, May 2000.
"PKI Interoperability Framework," PKI Forum, pp. 1-6, Mar. 2001.

* cited by examiner

*Primary Examiner*—Justin T. Darrow
(74) *Attorney, Agent, or Firm*—Bromberg & Sunstein LLP

(57) ABSTRACT

A method, system and program for automatic administration and management of a plurality of certificates and/or cryptographic keys, authentication of certificates, and authorization to access certificates or associated data. Each key is associated with a set of attributes so that the set of attributes is specific both to a user or group of users and to a particular use to which the key is intended to be put. Each user can automatically conduct any legitimate operation or process related to any certificate/key and/or group of certificates/keys by virtue of the associated set of attributes.

12 Claims, 14 Drawing Sheets

Drawing 4 – True PKI Core

A_GENERIC_CERTIFICATE

- owner unique identifier
- data (including but not limited to owner public key)
- issuer signature (Prior Art)

Figure 1

{ Others than Bob_UID }

.

.

Bob_UID
Data_1 of Bob_UID
Signature_1 for Bob_UID

Bob_UID
Data_2 of Bob_UID
Signature_2 for Bob_UID

.

.

.

Bob_UID
Data_k of Bob_UID
Signature_k for Bob_UID

.

.

.

Bob_UID
Data_n of Bob_UID
Signature_n for Bob_UID

.

.

{ Others than Bob_UID }

(Prior Art)

Figure 2

{ Others than Bob_UID }

.
.

Bob_UID
Data_1 of Bob_UID

Bob_UID
Data_2 of Bob_UID

.

.

.

Bob_UID
Data_k of Bob_UID

.

.

Bob_UID
Data_n of Bob_UID

.

.

{ Others than Bob_UID }

(Prior Art)

Figure 3

IMPROVED_GENERIC_CERTIFICATE

- owner unique identifier
- BAV
- data (including but not limited to owner public key)
- issuer signature

Figure 7

{ Others than Bob_ID }
.
.
.

Bob_UID
BAV_a
Data_1 of Bob_UID
Signature_1 for Bob_UID

Bob_UID
BAV_b
Data_2 of Bob_UID
Signature_2 for Bob_UID
.
.
.

Bob_UID
BAV_x
Data_k of Bob_UID
Signature_k for Bob_UID
.
.
.

Bob_UID
BAV_y
Data_n of Bob_UID
Signature_n for Bob_UID
.
.
.

{Others than Bob_UID }

Figure 8

{ Others than Bob_ID }

.

.

.

Bob_UID
BAV_a
Data_1 of Bob_UID

Bob_UID
BAV_b
Data_2 of Bob_UID

.

.

.

Bob_UID
BAV_x
Data_k of Bob_UID

.

.

.

Bob_UID
BAV_y
Data_n of Bob_UID

.

.

.

{Others than Bob_UID }

Figure 9

METHOD FOR DEPLOYMENT OF A WORKABLE PUBLIC KEY INFRASTRUCTURE

The present application is a continuation-in-part application of U.S. patent application Ser. No. 09/189,180, filed Nov. 10, 1998 now U.S. Pat. No. 6,401,203, and claims priority from Israeli Patent Application number 122254, filed Nov. 20, 1997, both of which applications are incorporated herein by reference.

TECHNICAL FIELD

The present application relates to a system and method for deploying True Public Key Infrastructure by means of automatic handling of certificates and key-based processes.

BACKGROUND OF INVENTION

The use of cryptography for purposes of data security is increasingly prevalent and critical to communication and commerce over networks that include computer communications networks, satellite data links, and PBX and ISDN telephony links of various kinds. Generally speaking, cryptography is based on cryptographic keys, which may be referred to herein as "C_Keys". In the description that follows, the term "enveloping" may be used to denote encryption, while the phrase "opening an envelope" may refer to decryption using a cryptographic key. Whenever one or more keys are stored (or otherwise available), there is a need for deciding, in each instance, what key is to be made available for a particular purpose. Thus, it might be desirable to make distinct keys available to distinct users, or, alternatively, to a distinct class of users for a specified purpose. The decision regarding which key, if any, is to be made available in a particular case is currently performed in a non-automated way.

Cryptographic keys may include both symmetric and asymmetric keys. Symmetric keys must always be kept only within a restricted group of users, because if a message is encrypted with a symmetric key K1 then anyone knowing K1 can decrypt that message.

For the case of asymmetric keys, at least one pair of keys is associated with each owner. One key of each pair of keys is private (known and kept only by its owner). The other key is public (i.e., it is distributed freely to the public). A message encrypted with one of the keys of the pair can be decrypted only with the other key in the pair. In addition, a message may be cryptographically signed with one of the keys in the pair and the second key in the pair may then be used to verify the authenticity of the specific message.

As used in the present description and in any appended claims, the terms "owner" and "user" are not restricted to humans but may equally encompass machines or programs, or, for that matter, multiple tasks and devices. In the following, the names "Alice" and "Bob" are used as examples.

For purposes of providing a concrete, though not limiting, example of the use of asymmetric cryptography, it will be assumed that Alice intends to send to Bob some secure message.

1. Bob must have a pair of keys and Alice must know Bob's public key;
2. Alice must have a pair of keys and Bob must know Alice's public key;
3. Alice generates a SYMMETRIC key which she uses to envelope her message to Bob, and uses Bob's public key to envelope the symmetric key, and sends both envelopes to Bob; and
4. Bob will open the envelope using Bob's private key to fetch the symmetric key sent by Alice and then use the symmetric key to fetch the message.

For conveying a signature, Alice uses a hashing function to generate a digest (D) of the message and signs the digest using Alice's private key producing SD. Bob then opens SD using Alice's public key, thus recuperating D. Subsequent to retrieving the message received from Alice, Bob produces a digest (D1) of the message using the same hashing function that Alice used. Only in the case D and D1 are identical Bob may assume that Alice signed the message that Bob received from Alice.

Bob's postings to Alice undergo the same procedure but with "Alice" and "Bob" exchanged.

In order to accomplish the transmission described above, Alice and Bob must exchange their respective public keys in such a way that each of them knows at a satisfactory level of confidence that the key received really belongs to the real user. This is referred to as an "authentication problem," and is addressed by authentication centers. Such a center—usually referred to as a Certificate Authority (CA)—delivers certificates by means of a Certificate Server (CS). A certificate confirms some linkage between data elements, which may include, without limitation, a name (or any other identifier) and a public key. Typical elements of a certificate are those depicted in the schematic representation of a prior art certificate shown in FIG. 1. It is assumed that the public key of some CA is well known. Hence if Alice asks for Bob's certificate and such a certificate has been released by a particular CA, referred to as CA_X, then Alice might check the validity of the certificate and its contents (including it's being related to Bob and usually holding Bob's public key) by using the public key of CA_X (which is assumed to be known to Alice directly or by other well-known tracing means).

For purposes of the present description, and in any appended claim, the term "cryptographic key" will, as a matter of definition, be understood to refer, as well, to certificates that contain keys. Similarly, the term "certificate" will refer, as well, to keys contained within them. Finally, again as a matter of definition, the term "certificate authority" will be understood to include one or more certificate servers, whether or not pertaining to a single certificate authority.

Some user might have a number of certificates. The certificates of a user might reside on one or more certificate servers. Reasons for maintaining multiple certificates per user include, for example, separating C_Keys at home from those used at the work place, so that access by an employer, for example, does not compromise the security of the documents not related to the workplace. Another reason might be that distinct applications may use different protocols with different cryptographic schemes or different forms of data representation.

Referring again to the hypothetical example, in light of a plurality of potentially available certificates, if Alice is interested in fetching one of Bob's certificates (which may reside on one or more Cerificate Servers), and the CS has a number of certificates for Bob, then the CS might randomly offer to Alice one of them, all of them or none, unless Alice supplies a more precise definition that points uniquely to some specific certificate.

More particularly, Bob might have a unique identifier, referred to as Bob_UID, as well as a multiplicity of certificates located at some CS. The arrangement of stored certificates is shown schematically in FIG. 2. When Alice asks for Bob_UID, the CS has no means to know which certificate to deliver to Alice since Bob_UID points to all certificates owned by Bob.

Similarly, if Alice maintains public key counterparts of a multiplicity of keys belonging to Bob (referred to as Bob_1, Bob_2 . . . Bob_N, each unique}, then Alice has to decide each time which one of Bob's public key to use in a particular situation. The storage of data including Bob's certificates in Alice's database is depicted schematically in FIG. 3, illustrating the ambiguity of a reference to Bob_UID. Furthermore, since Alice might wish to use a particular key of Bob's for a particular task and since there are a number of public keys in Alice's database, Alice is currently required to perform many individual non-automated steps.

Owing to the spreading prevalence of C_Key systems in the various contexts discussed above, and more particularly to the absence of well-defined relationships among technologies, protocols, certificates, etc., a method for automated C_key management and administration is desirable.

It is well known that the core of secured communications is trust. Trust is non-tangible—one cannot physically point to trust, see or show its image. Trust is non-transferable. If Alice trusts Bob and Bob claims something about Charley then perhaps Alice believes that what Bob says about Charley is true, but this does not imply that Alice would trust what Charley may say about itself or anyone else. Trust is relative and thus bounded. If Alice trusts Bob this does not imply that Alice would take for granted ALL that Bob says; or that Alice would authorize Bob to do all and everything on Alice's behalf and/or with assets controlled by Alice. Alice may trust Bob for some purposes and at some extent. While the situation of Alice not trusting Bob is very clear, Alice trusting Bob implies to clearly define the span of such trust ("for what") and its degree ("how much").

Between a Certificate Authority (CA) and a Deployment Site (DS) there must be a relation of trust. If DS desires a CA to grant a certificate on behalf of the DS (i.e., DS wants CA to certify that DS is who he claims to be), then:

DS must trust the CA for the purpose of having the certificate released

CA must trust DS for the data that the CA is about to certify regarding DS

Such situation is represented by FIG. 4—The ID Equation. Between CA (101) and DC (102) a trust relationship (103) must be established. Such relationship is based on the principles of the circle of identification and authentication. Each side has to identify the other side and authenticate the means leading to such identification. Once the circle is closed, CA will release a certificate to DS. This process is similar to the process through which an individual obtains a passport from his/her country. It is obvious that the degree of authentication and identification is bounded. As an example, for some purposes DS may need to be identified by its absolute identity such as its registered name with the State or its social security number. For other purposes CA may need to identify DS by a non absolute identity such as a pseudo-name (e.g. DS nick name, DS e-mail address). Obviously the degree of identification will impact the degree of trust DS might gain from a counterpart receiving such certificate granted by CA.

For the purpose of example let be assumed that DS Alice gains a certificate from CA. Alice presents to Bob such certificate, Alice's immediate goal being to convince Bob that Alice is the legitimate holder of the certificate. To do so Bob conducts a process of authentication and identification as described in FIG. 5 {DWG2}. First Bob must trust the CA (201) for the purpose of authenticating Alice's identity. If Bob does not trust the CA, then the certificate has no value in the context of Alice's immediate goal. If Bob trusts the CA then Bob authenticates the certificate (202). That is, Bob makes sure that the certificate is from CA and it is valid. For this purpose Bob checks the certificate and the CA signature on the certificate by means of the public key of the CA; and makes sure certificate validity time did not expire; and makes sure the certificate is not included in the Certificate Revocation List (CRL) of CA. Third Bob identifies the subject (203) being Alice by some means like biometric data or electronic signature (challenging message) from Alice. Forth, if phases 201–203 are successful, then Bob trust Alice at least to the extent of what the certificate states but not necessarily beyond that. For example, if the certificate certifies Alice's name, then Bob trusts that he is communicating with Alice, which enables Bob to trust the physical integrity, technical authenticity and signature of messages sent to him by Alice. Bob may also encrypt messages for Alice and trust that such messages are understandable only by Alice, thus allowing privacy of the messages sent by Bob to Alice. However, having Alice identified by Bob does not imply that Bob trusts the intrinsic contents (e.g. expressed ideas) included in messages he receives from Alice. For example, even when Bob believes that Alice is who she claims he would not necessarily trust Alice claiming she acts on behalf of Charley, unless Alice can present to Bob some proof for that. Obviously here a new need for trust occurs, since Bob has to trust the authenticity of the proof and the fact that Charley empowered Alice to act on his behalf. It is a matter of Alice being granted some privileges by Charley, Bob trusting that Charley granted the said privileges to Alice and then eventually Bob may facilitate Alice to take advantage of such privileges.

Under some circumstances a certificate may contain privileges. Alternately, privileges may be stated in a separate authorization bounded to one or more certificates. The holder of such authorization has a non-empty set of privileges. For example, a visa is a privilege granted to its holder to enter the country that released the said visa. But the visa is useless unless its holder can be identified by his or her authenticated passport, which must be thought valid and granted by a trusted representative of a legitimate State. In other situations an authorization does not require to identify the holder in an absolute manner, such as his/her real name. For example, a phone card authorizes the holder to make phone calls from a public phone of some company. While there is need to authenticate and identify the phone card grantor, the card and the phone in which the card is inserted there is no need to identify the holder of the card.

In the world of electronic communications, which by nature is borderless, the reality is extremely complex as represented in FIG. 6. The Set of Mind (301), which is of a human nature, impacts Trust (301-$a$). There always is a set of Rules (302) of behavior without which ordered society cannot exist. The set of rules encompasses Laws (302-$a$)— imposed by Counties, States or other forms of socio-political orderliness—and Procedures (302-$b$) that are established by a local organization such as workplace. Trust, laws and procedures integrate into Policies (303). Policies (303) and technologies (304) integrate into Solutions (305). Solutions are what finally count for secured data and secured communications in real life.

In the past several attempts to create centralized or quasi-decentralized mechanisms of managing certificates and keys on the grounds of centrally approved policies were made. The intention was to impose methods enabling digital certification. These attempts failed. Privacy Enhanced Mail is one example of such failure. Multilevel Information Systems Security Initiative (MISSI) is an additional example for such an attempt that resulted in failure. It was proven that it is impossible to impose a uniform centralized model of policies (and solutions) for digital certification and use of such certification. Society recognizes the need for replacing compulsory approach with collaboration and agreement on the security deployed by the sides in a transaction and/or a communication session. Public Law 106-229 represents such an effort. While this statute deals with validity of electronic records and signatures for e-commerce, it does not teach any practical way of doing so in the solution sense. It only recognizes the need for such solutions and lays the legal grounds on which the solutions may relay. A similar need is also suggested by General Directive 95/46 of the European Community. Moreover Directive 95/46 emphasizes the rights for privacy and sets a serious challenge of coping with the variety of laws relevant to electronic transactions, data communication and data storage in the European Community (EC) as well as worldwide from the standpoint of EC. Overall it is obvious that the world community recognizes on one hand the need for data and communication security while on the other hand the community leaves to the parties to decide by agreement and within the legal frame appertaining to different places what kind of security solution should be deployed.

Public Key Infrastructure (PKI) known as of now is restricted to X.509 certificates. PKI is segmented since the PKI concept is tied to isolated CAs. Attempting to bridge over this segmentation, some CAs conduct a process of cross-certification. But cross-certification, despite its aim, does not solve the problem of trust—since as already mentioned trust is non-transferable. For example Alice trusts CA1 and CA1 cross certifies CA2. Alice might authenticate a certificate from CA1 and identify CA2 through the certificate granted by CA1 to CA2. Alice may validate in the technical sense a certificate granted by CA2 to Bob. Yet Alice will not implicitly trust the contents of a certificate granted by CA2 to Bob (she may doubt that truthfulness of the contents of such certificate). It is clear that if Alice trusts CA2 then CA2 does not need a cross certificate from CA1; and if Alice does not trust CA2, having CA2 cross certified by CA1 is useless. Other means of managing and administering certificates and keys, such as Pretty Good Privacy (PGP), Simple Public Key Certificates (SPKI) and Simple Distributed Security Infrastructure (SDSI) use non X.509 formats of certificates and are based on heterogeneous technological as well as heterogeneous policy concepts. As a result of this situation, known art is unable to satisfy in an integrative manner the needs for solutions as represented in FIG. 6.

SUMMARY OF THE INVENTION

In accordance with a preferred embodiment of the present invention, a method for deploying True Public Key Infrastructure (TPKI) is provided. TPKI synergistically integrates Automatic Handling of Certificates and Key-Based Processes as described herein, adding to it the powers of generating, managing and administering authorizations.

In accordance with embodiments of the current invention, a set of integrated blocks, referred to herein as "Engine," embodies the capabilities required to support and deploy TPKI while providing an interface for further integration with applications and an interface with a human user.

Deployment of TPKI by means of the Engine enables delivery of secured communications and data transfer within a heterogeneous universal communications network as well as deployment of access control in the logical as well as physical sense.

TPKI finds its application in a wide range of fields and activities for which secured data transfer and data storage are vital by order of law, by ethics and by functional needs of users and organizations.

BRIEF DESCRIPTION OF THE DRAWINGS

The invention will be more readily understood by references to the following description, taken with the accompanying drawings in which:

FIG. 1 is a block schematic of a prior art certificate;

FIG. 2 is a schematic showing how prior art certificates are stored by the CS;

FIG. 3 is a schematic representation of how data may be stored in the database of a prior art user;

FIG. 7 is a block schematic of a certificate in which a Block of Attributes Vector has been included in accordance with a preferred embodiment of the present invention;

FIG. 8 is a schematic representation of certificates stored in a CS in accordance with embodiments of the present invention;

FIG. 9 is a schematic representation of how data may be stored in a database with a BAV associated with particular public keys, in accordance with embodiments of the present invention.

DETAILED DESCRIPTION OF SPECIFIC EMBODIMENTS

Figure 4:
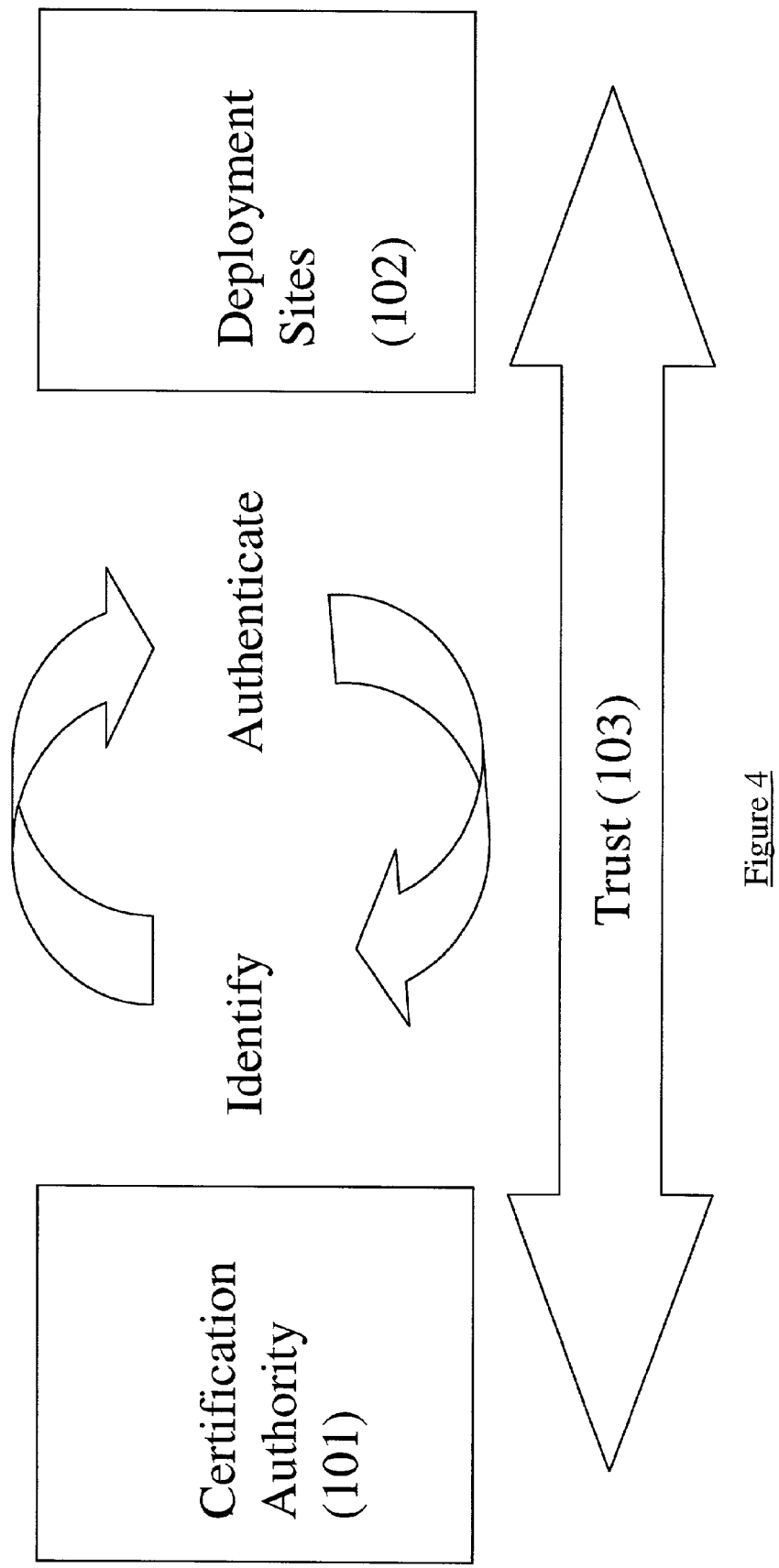
FIG. 4 depicts the ID Equation, known in the art, showing the basics of a user enrolling with a CA.
Figure 5:
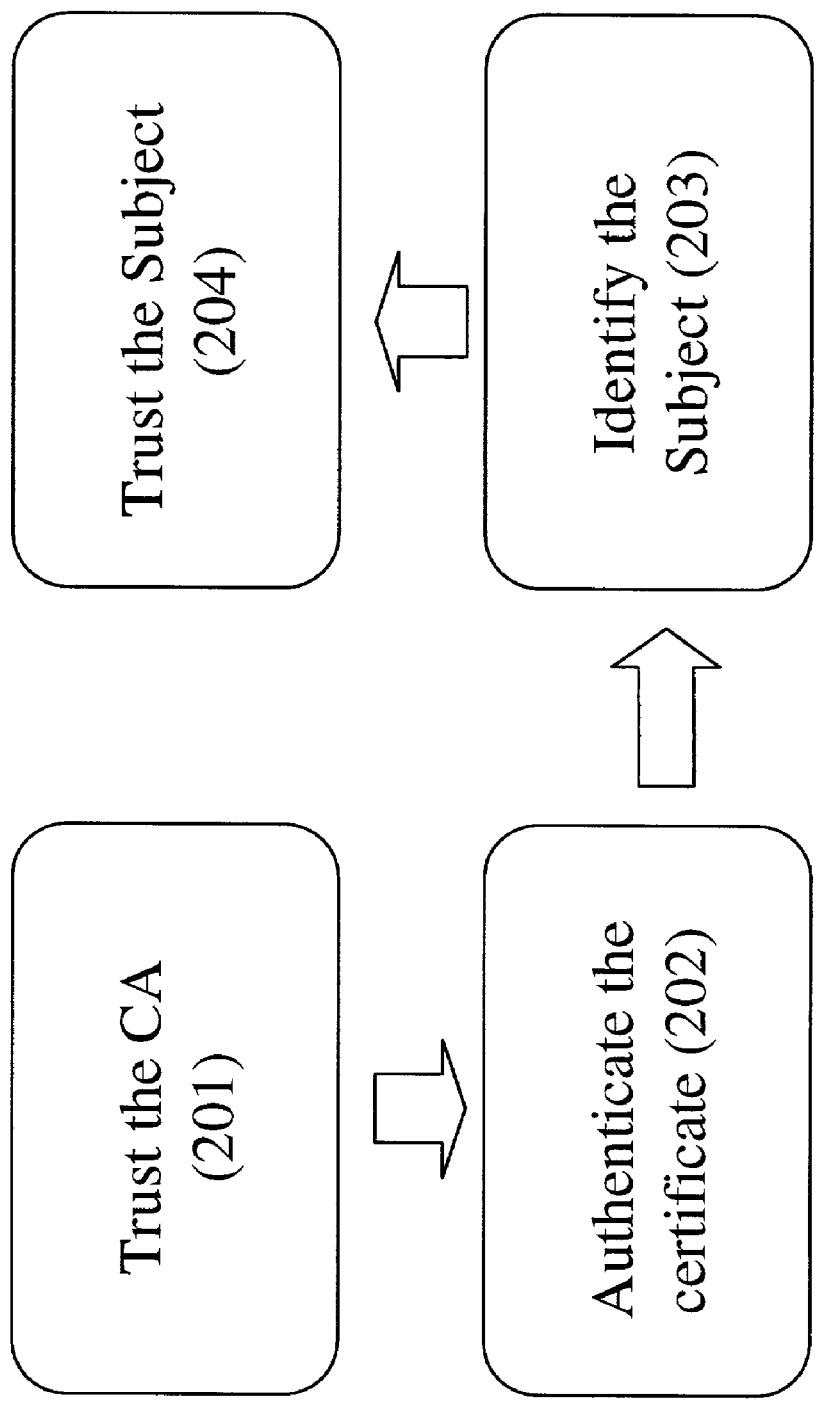
FIG. 5 shows the components of an Authentication/Identification Process, known from prior art.

The term "attribute," as used in the present description and in any claims appended hereto, refers to any parameter that may influence how and why to use a particular certificate and/or cryptographic key. The totality of attributes associated with a certificate or C_Key may be gathered in a vector herein referred to by the term "Attributes Vector" (AV).

In accordance with preferred embodiments of the present invention, a unique AV, serving as a well-defined qualifier, is attached to any certificate and/or to any C_Key, thus enabling automatic management and administration of certificates and C_Keys. Management refers to the determination of policy, for example with respect to criteria for granting, revoking, replacing a user certificate or certifying subordinated CA sites, etc. Administration refers to the implementation of such policy. The present invention is advantageously employed in both management and administration contexts, and the term "administration" is used herein, and in any appended claims, in an inclusive sense that incorporates management functions. The use of an AV, in accordance with the present invention, may advantageously provide for deterministic routing of messages to devices or users in an efficient way. Implementation of such deterministic routing in either hardware or software, or in a combination of the two, will be referred to as a "router."

The use of an AV is independent of cryptographic technologies, which may include, within the scope of the present invention and without limitation, RSA algorithms, the Certicom ECC algorithm, Diffie-Hellman algorithms and any other. Delivery of certificates may be under any format, including, again without limitation, the formats of X.509 (and its versions), General Certificates (GC), Simple Public Key Infrastructure (SPKI) etc. Any protocol may be employed in practice of the present invention, including, by way of example, such protocols as MIME, S/MIME, HTTP, UDP, SMTP, SET, etc., such protocols referring to a part, or the whole, of a communication session.

Referring to FIG. 7, in accordance with embodiments of the present invention, a special data block is added to a certificate: the Block of Attributes Vector (BAV). The following types are examples of types that may be included as elements of the AV:
(a) Type of cryptography used for the certificate itself (RSA, ECC, etc.);
(b) Type of cryptography/algorithm to be used by the devices/process for the session (RSA, ECC, Diffie-Hellman, DES, Blowfish, etc.);
(c) Type of intended process user/peripheral device (terminal, phone, fax, smart card, etc.);
(d) Type of the intended certificate user (computer application, physical device, etc.);
(e) Type of the certificate owner entity (private person, CA, institute, etc.);
(f) Type of channel/protocol to be used (PBX, ISDN, TCP/IP, HTTP, SMTP, UDP, etc.);
(g) Type or purpose of session (control, data, etc.);
(h) Type of the certificate grantor (CS/CA level, authentication level, etc.);
(i) Type of physical location (home, office, vehicle, etc.);
(j) Type of logical location (global, cluster, site, disk, etc.); and
(k) Types of auxiliary data for dedicated purposes (reserved for future use or applications).

Each type may assume different values, with these values corresponding to the "attributes" defined above.

Thus, a value may be associated with each element in the Attribute Vector linked to a particular certificate or C_Keys of a certain owner. These comprise the BAV added to each certificate, as shown in FIG. 7. A certificate including a BAV in accordance with the present invention may be referred to as an "improved certificate."

Referring now to FIG. 8, Bob is shown to have a unique identifier Bob_UID and a multiplicity of improved certificates located at some CS. Now, while Bob_UID points to all certificates owned by Bob, Bob may have a multiplicity of BAVs (indexed as BAV_k) each of which is unique. Thus, the conjunction of the UID and an instance of BAV is unique and points to only one certificate, intended to satisfy the requirements, described by the attributes, for one entity. The result is that if the CS is requested to deliver a certificate owned by Bob_UID having BAV_k, then there will be no more than one such a certificate; and, if such a certificate exists, it may be immediately delivered by the CS.

Referring to FIG. 9, once Alice receives any improved certificate, she can store the data she is interested in. Such data will typically contain Bob's public key and the relevant BAV linked to it. Now, any application pertinent to Alice may automatically access Bob's public keys in view of specified requirements for conducting tasks between Alice and Bob by virtue of the attributes, as reflected in the values set in the BAV.

Bob on his side, will receive some signaling or controlling data letting him know what BAV has been deployed to Alice. This defines to Bob which of his private key to use and which one of Alice's public key to use.

Furthermore, in accordance with an alternate embodiment of the present invention, if Alice decides to conduct some task for some BAV_u common to many Bobs, this can be easily done by simply fetching from Alice (or the CS) database all certificates or keys satisfying the values of BAV_u. And, in accordance with yet another alternate embodiment of the present invention, a subgroup of attributes, denoted bav, may belong to BAV. Such a subgroup may act as a logical filter for selecting or eliminating certificates from some intended use of certificate or keys. In an alternative embodiment, the disclosed method for handling certificate and key-based processes may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In accordance with a further alternate embodiment of the present invention, the described method of attribute storage and certificate administration may be advantageously employed in a certificate clearinghouse or repository for handling certificates granted by any number of CAs. A user may request a certificate associated jointly with a specified owner, a specified certificating authority, and a specified intended purpose for using the certificate. Such a clearinghouse may additionally provide linkage or indexing between or among certificate serial numbers to the extent to which the serial numbers may change when a certificate is replaced.

The present invention may advantageously open the gate towards comprehensive secured communications and secured transactions solutions. The current invention describes the Method for True Public Key Infrastructure (TPKI). TPKI synergistically enables solutions based on all types of digital certificates—known and envisioned. As such TPKI fully enables certificates and keys management and administration as well as their deployment. TPKI is also open for future technologies and policies providing a flexible platform for data security and secured communication solutions.

Figure 10:
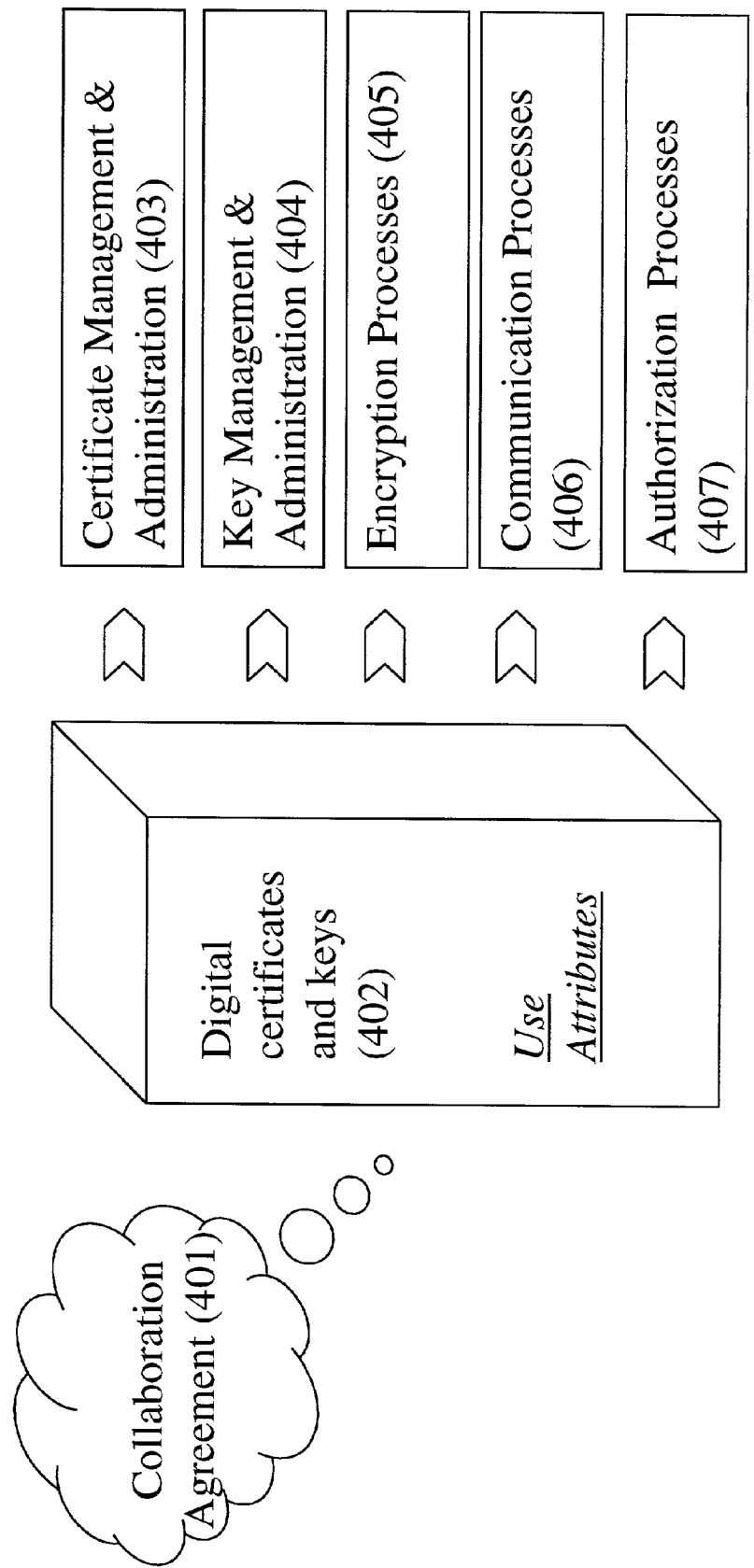
FIG. 10 shows the core of True PKI Core in accordance with embodiments of the present invention.

FIG. 10 depicts the core of TPKI. The basic assumption is that secured data transfer for any purpose is based on agreement and collaboration (401) between the communicating sides. Digital certificates and keys (402) are to be used by attributes which enable:

Certificate Management & Administration (403)
Key Management & Administration (404)
Encryption Processes (405)
Communication Processes (406)
Authorization Processes (407)

Figure 11:
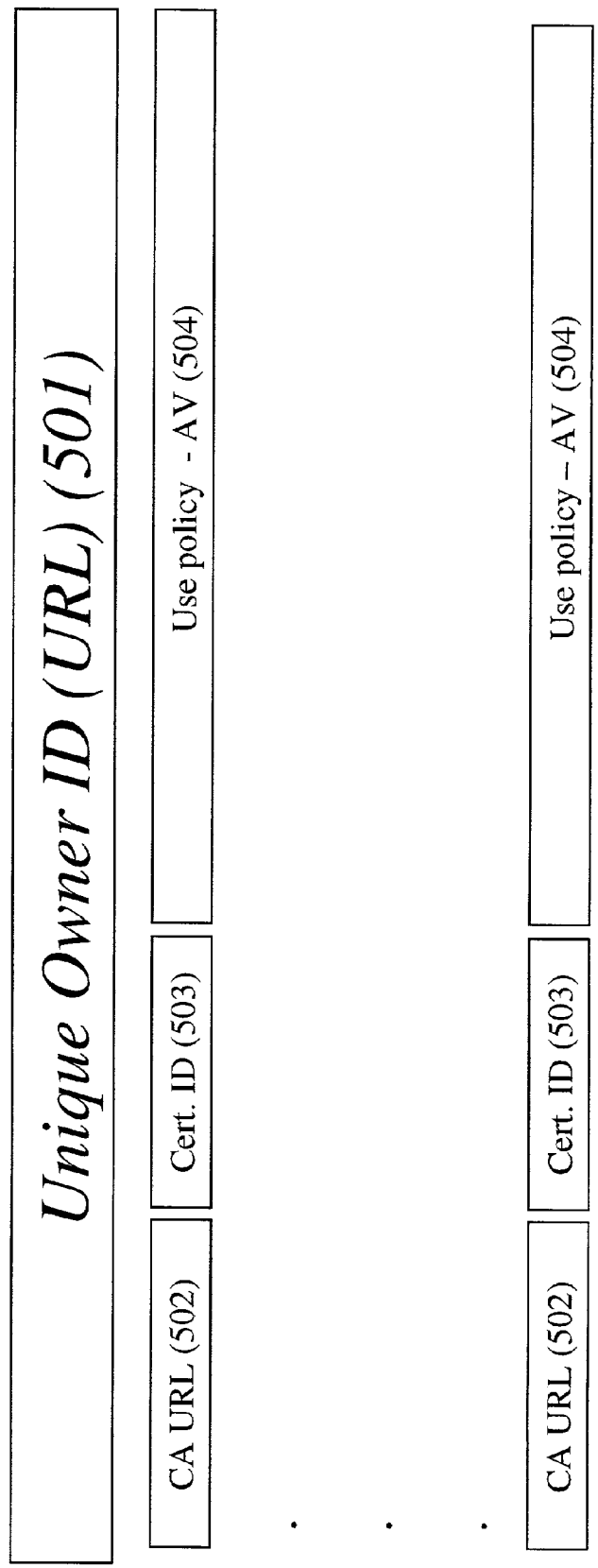
FIG. 11 shows the organizing of certificates and attribute vectors belonging to some owner in a bin of a Global Handshake Server, in accordance with embodiments of the present invention.

The Attribute Vector (AV) and the Block of Attribute Vectors (BAV) are and how to use them are described above. For the purposes of TPKI a repository of certificates and associated BAVs is created. Such repository can be implemented for example by means of one or more computer servers—herein Global Handshake Server (GHS). As explained above, each owner of at least one certificate is granted a unique user ID within the GHS space. For better clarity, it is possible that an owner decides at its discretion to owe more than one unique ID. This may happen in case an owner wishes to have, for example, one ID associated with his/her absolute identity and one or more IDs associated with one or ore more pseudo-identities (e.g. nicknames). For each unique ID the owner is granted within the GHS space a storage bin (herein "bin"). The owner and only him/her has the privilege to alter the data in the bin s/he controls. Any other user is entitled to fetch data from owner's bin. The owner may limit the access to parts of contents in his/her bin by means of requiring special authorizations. In such case, parts of the bin contents are accessible by any other user while other parts of the bin contents are selectively accessible only by users being authorized by owner to do so. The bin contents are schematically described above with reference to FIG. 8. For further clarity, FIG. 11 represents graphically how the bin contents are organized. Any user can reach the bin by owner's unique ID URL (501). Within the bin, every record has a unique CA URL (502) that points to the CA which issued the certificate to the bin owner. In addition every record has a unique identifier within the granting CA for the certificate Cert. ID (503). The combination of the CA URL and the Cert ID will always point to a unique certificate. The owner is responsible for setting and maintaining the values of these fields. The Use Policy (504) is set in the AV that represents owner's directives for using the certificate(s) to which the AV is appended. Any user having his/her preferences can search owner's bin for an AV satisfying user's needs. When such AV is found, the inquiring user receives form the GHS the corresponding CA URL and Cert. ID. The existence of an AV in the bin suggests that owner and inquiring user share at least one common pattern of a secured communication solution preferred by both.

Finding such AV and returning the corresponding record to the inquiring user is subject to one of the following conditions, which are reflected in definitions incorporated in AV:

The record is defined public, so no authorization is needed to fetch it

The record requires a special authorization by the owner and the inquiring user presents such authorization to GHS The owner is in full control of the contents of his/her bin. It insures that the bin will always presumably contain routing to certificates that are valid (not forged, nor repudiated). The owner may also decide that the bin contains the certificates and not the pointer (CA URL AND Cert ID) to the certificates. In such case the certificate becomes a composed field of the AV associated with it, and the AV reflects that the certificate is included. It is always inquiring user's responsibility to verify that the certificate of an owner appertains to the owner—as the owner claims and; that the certificate is valid. As such, it must be emphasized that the GHS needs not be trusted in the sense a CA must be trusted since the GHS does not issue certificates. TPKI provides the means for maintaining and handling the data in the bin, as it will be explained below, through the "Engine".

As mentioned earlier, the AV may reflect a requirement according to which a user must present an authorization for fetching the associated certificate. In lack of such authorization, requiring user will be informed that no certificate with an AV satisfying user's request can be located. In contrast, if requesting user presents a valid AV, and an authorization to fetch the associated certificate GHS will release the data pointing certificate to the certificate in the granting CA or the certificate (if stored by owner in GHS).

Figure 12:
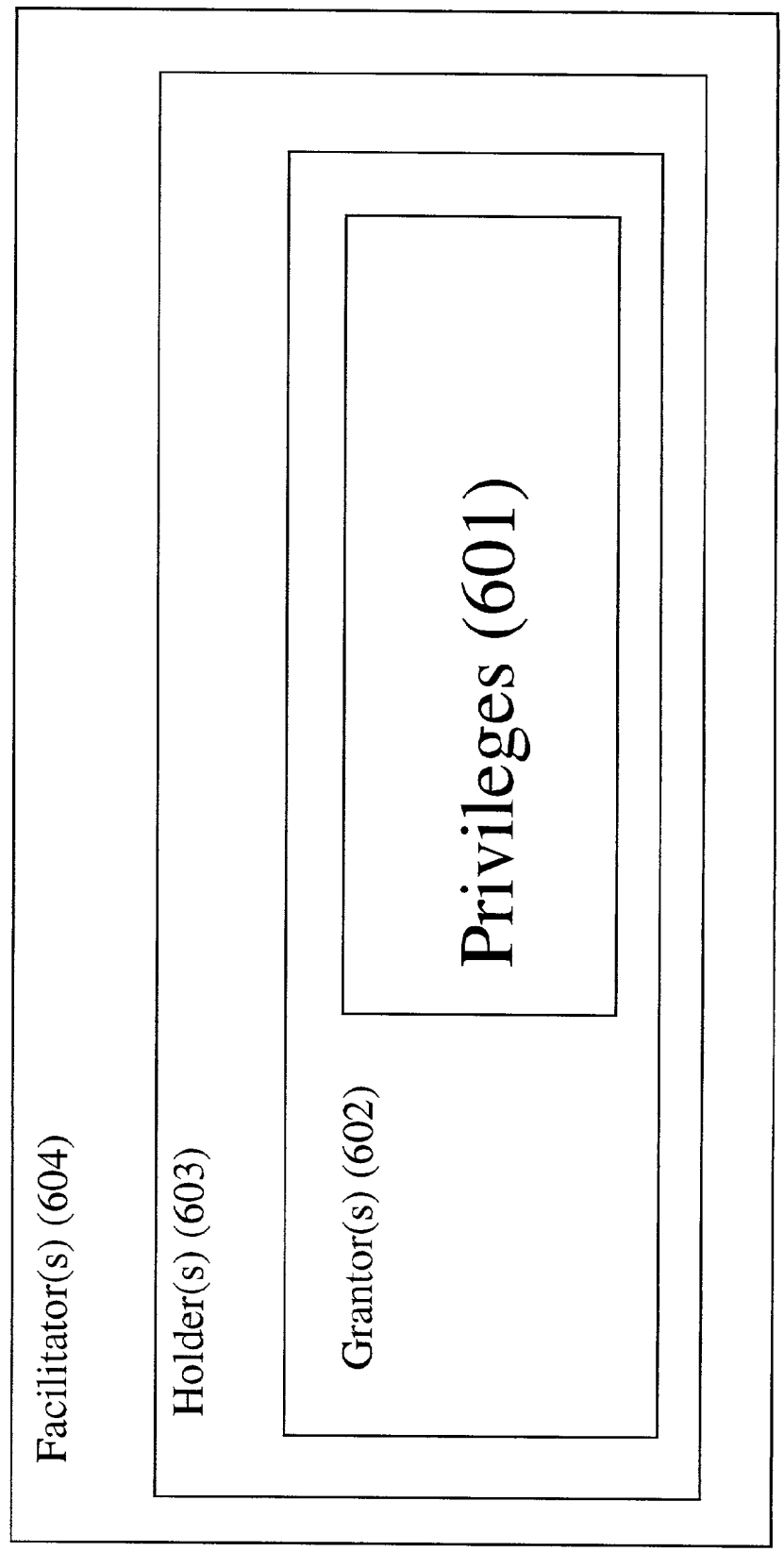
FIG. 12 depicts a structure of an authorization that takes advantage of TPKI, in accordance with embodiments of the present invention.

TPKI incorporates a mechanism for handling authorizations related but not limited to use of GHS purposes. FIG. 12 illustrates the idea of such authorization. The authorization contains:

A non-empty set of privileges (601).

The set of privileges is always signed by at least one grantor (602)

The set of privileges is optionally signed by one or more holder(s) (603)

The set of privileges is optionally signed by one or more facilitator(s) (604).

The set of privileges may bear any form, be valid for a limited or unlimited time period; be meaningful in context of a physical or virtual place/domain and so on. The duty of the facilitator is to enable or help the holder of the authorization to take advantage of the privileges that the grantor decided to grant to the holder. In order for an authorization to be effective a set of conditions must be met. Such conditions are:

Under some circumstances the holder(s) must be able to authenticate and identify the facilitator(s) before facilitator is granted the right to know about the existence of the authorization. That is, facilitator must have a permit (authorization) to ask the holder for a specific authorization. By doing so holder is protected from letting a presumed facilitator to know what authorization the holder possesses. For example an intelligence agent would want his golfing club to access the authorization of benefiting from golf club advantages but would not want the club to know s/he has any intelligence authorization, thereby indicating that s/he is a secret agent.

The facilitator(s) must be able to read (decrypt) the contents of the authorization as a whole and understand the contents for the purpose of enabling holder to practice the privileges set in the authorization by grantor.

The facilitator(s) must be able to authenticate and identify holder(s) if the privileges are linked to such specific holder(s).

The facilitator(s) must be able to authenticate the signatures of the grantor(s).

The integrity of the contents, as signed by the grantor(s) must be proven by facilitator(s).

All above conditions can be perfectly satisfied by means of certificates that comply with the agreed terms of use as stated in the corresponding AVs. Using cryptographic means as agreed by the sides—such as encryption/decryption, hashing and signing—serve for the purposes of deciphering and validating an authorization and then enabling the facilitator(s), by order of the grantor(s) to help the holder(s) to take advantage of the privileges stated in the said authorization.

Figure 13:
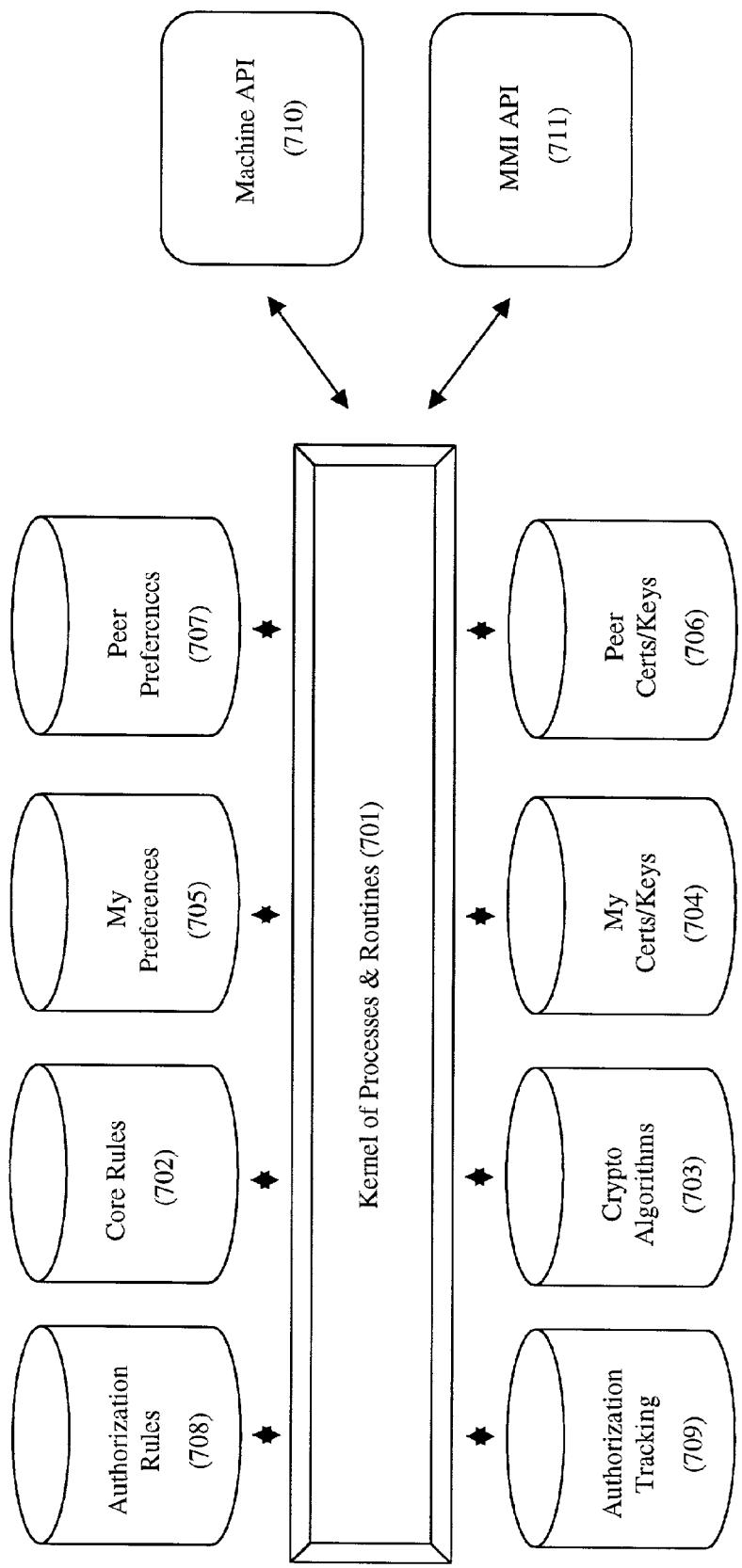
FIG. 13 is a schematic of components of a public key infrastructure engine in accordance with embodiments of the invention.

The set of tasks involved in managing keys, certificates, the bin on/form the GHS, authorizations and then enabling applications to use al these is extremely complex. In order to cope with this complexity an embodiment uses in whole or in part a set of utilities collectively referred to herein as "Engine". FIG. 13 exemplifies the general schematics of the Engine. The Engine is built around a common kernel of processes and routines (701). This kernel is responsible for coordinating and harmonically integrating the other components of the engine. For example the kernel is responsible for searching and matching certificates, keys and AVs required for a secured session taking place between at least two parties. The kernel is also responsible for enforcing the rules and deploying algorithms according to the agreed AV while using data stored in the other components of the Engine. The kernel is responsible for conducting tasks such as validating certificates vis-à-vis the granting CA as well as manipulating authorizations. The kernel automatically maintains the link of public keys with the certificates that include the keys. Private keys are managed vis-à-vis the corresponding public keys. The kernel manages and administers private keys and symmetric keys (by the Core Rules and the Crypto Algorithms—explained below). A database contains the core rules (702) by which the Engine operates. Such core rules reflect legal aspects and local procedures complying with the requirements of the place in which applications are deployed. A database contains the Cryptographic Algorithms (703) to be deployed and; as such it supports the cryptographic tasks to be conducted. The owner stores his/her certificates and keys in a database named MyCerts/Keys (704). Owner's private keys and owner-generated symmetric keys are stored in an encrypted format in MyCert/Keys (704). The owner stores his/her AVs and their association with his/her certificates in database My Preferences (705). My Preferences stores additional data such as which parts of activities are conducted by the Engine silently, which parts require user intervention (e.g. approval to continue) and which parts are accompanied by messaging (e.g. warnings and confirmations of completion). Certificates and keys belonging to counterparts (peers) are stored in database Peer Certs/Keys (706). Peer's generated symmetric keys used in communications between owner and peers are stored in an encrypted format in Peer Certs/Keys (706). Peer preferences as expressed by peer AVs and associated with peer Certs/Keys (706) are stored in database Peer Preferences (707). Rules set by the owner regarding authorizations granted or to be granted by owner are stored in database Authorization Rules (708). Data regarding authorizations that are exceptions such as revoked or expired is stored in database Authorization Tracking (709). The Engine communicates with applications (e.g. computer programs) through Machine Application Interface—API (710). A human user communicates with the Engine through the Man-Machine Interface—MMI (711).

Applications are granted services and receive status information regarding completion and/or condition of tasks from the Engine through API. Through API application request from the Engine services for data sets that the application forwards to the Engine. Through API application are granted by the Engine:

Certificates/keys authentication and validation
Messages encryption/decryption services compliant with AV
Signature verification compliant with AV
Choosing channeling and protocol selection compliant with AV
Generation of outgoing authorizations
Validation of incoming authorizations
Filtering privileges of incoming authorization (in combination with certificates and compliant with AV(s).
Handshaking at the application level with GHS/from GHS
Fetching and/or validating a certificate directly with the CA assumed to be the releaser of such certificate
Searching for a certificate in the CRL of a CA
Downloading new modules or updates
Status of operation conducted by the Engine at the request of application The human user communicates with the engine through Man-Machine-Interface—MMI (711). By means of MMI human user:

Is informed, in friendly easy to understand and operate manner, about:
  core rules
  available crypto capabilities (by outcomes, strength and limitations)
  rule (legal and procedure) constraints
  existing keys and certificates (of his own and of peers)
  associations of keys/certificates with AVs
  existing authorization rules
  authorization tracking
Is entitled to instruct Engine to:
  alter rules
  update crypto capabilities
  manage and administer own certificates, keys and associated AVs
  create new or modify existing AVs for own certificates and keys
  delete or refresh certificates, keys and AVs belonging to peers
  communicate with GHS for initiating or altering own bin
  set criteria for authorizations
  set criteria for authorization exceptions
  set degree of automation by which routine security tasks (using certificates and keys, encrypting messages, signing messages etc.) will be conducted.
  Set the level of alerts and warnings displayed through order of Engine It is to be mentioned that once the human-user tunes the Engine, routine security tasks conducted by Engine will take place automatically without demanding step-by-step manual intervention form user side, unless user instructs the Engine to reduce automation.

Figure 6:
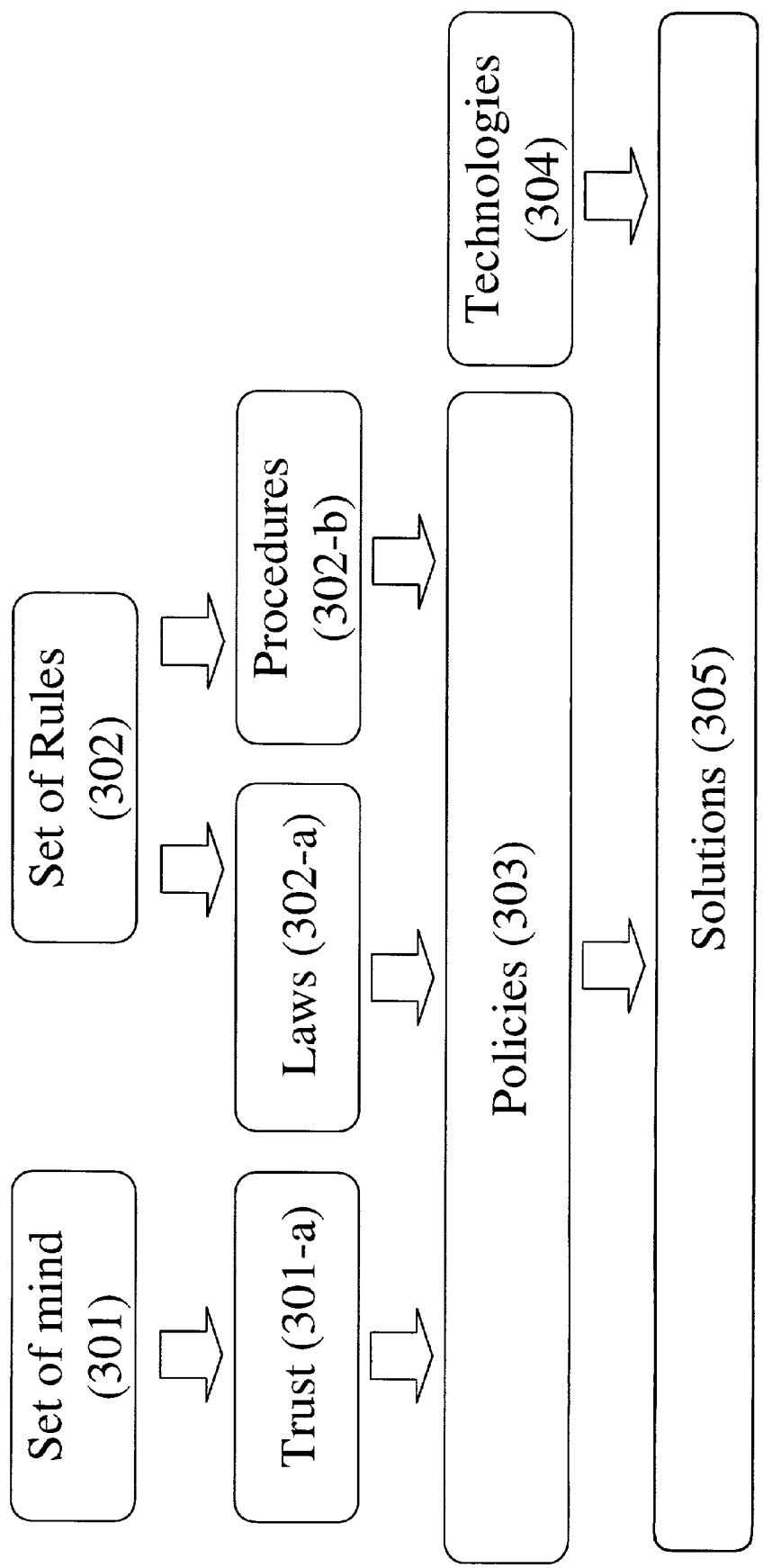
FIG. 6 depicts, for background purposes, how elements from real life impact the need for solutions enabling secured communications.

Through its concept and architecture the Engine enables the deployment of TPKI on the basis of principles such as those described herein. It is clear that the Engine satisfies the complexity imposed by reality as described in FIG. 6. By concept and architecture the Engine is versatile and scalable. Embodiments of the engine in whole or in part can take the form of pure software to be installed on different platforms dedicated hardware to fulfill tasks in a faster way firmware to be incorporated in different kinds of devices.

Figure 14:
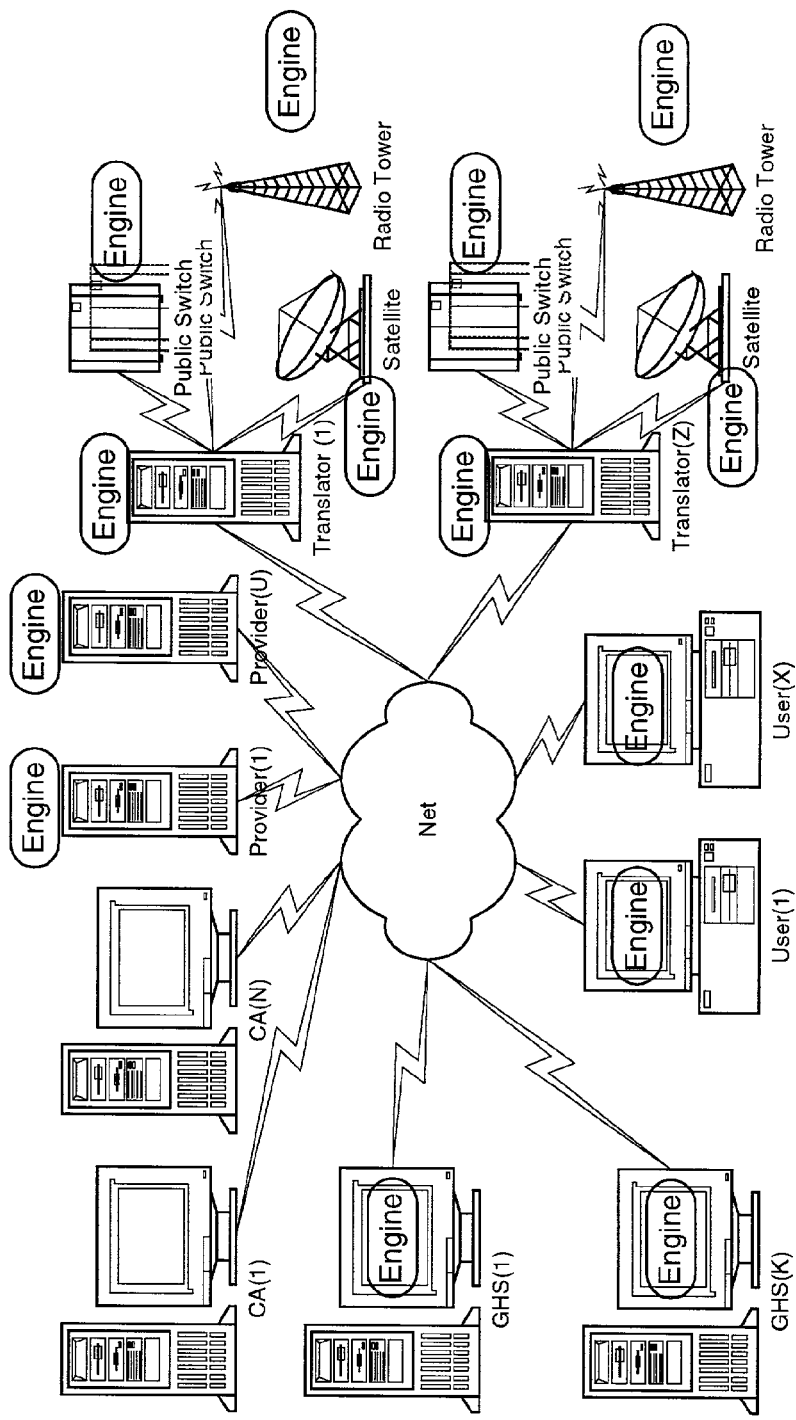
FIG. 14 depicts a Worldwide Deployment Model, representing a global implementation of TPKI, in accordance with embodiments of the present invention.

Through such embodiments TPKI can be deployed worldwide. FIG. 14 schematically exemplifies such worldwide deployment. According to this model, there is a plurality of CAs marked as CA(1) to CA(N). None of them needs to deploy the Engine. Users(1) to User (X) will continue to subscribe to CAs or equivalent providing any sort of certificates (e.g. X.509, SPKI, SDSI). However users' computers and devices will have to incorporate the Engine. Service Provider(1) to Service Provider(U) will also incorporate the Engine while supplying services in the wide meaning of the term "service" (e-commerce, e-banking, etc). Translator(1) to Translator(Z) will incorporate the Engine and interconnect communication devices such as public switches, satellites and radio towers, each of them incorporating the Engine as well. GHS(10) to GHS(K) are integrated in this clustered picture which connects to a worldwide communication infrastructure such as Internet (Net). All devices connected to the Net may continue to operate the very same way they did before the deployment of TPKI. However once the Engine and the GHS are implemented as suggested, the devices connect to the Net can benefit from the security advantages offered by the Method for Automatic Handling of Certificates and Key-Based Processes described herein.

TPKI may advantageously be applied in securing numerous fields such as:

Finance—financial transactions (e.g. funds and shares transfer)

Insurance—transactions involving transfer of data (e.g. setting or altering life insurance policies, placing, negotiating and settling health claims)

Advertising—assuring accountability and authenticity for ads and their contents

General messaging—posting, teleconferencing, sending/receiving faxes, conducting phone conversations over wire and wireless means Medical informatics—exchanging data of medical and/or healthcare nature E-Commerce—establishing, following and enforcing contractual relations as well as controlling payment method and beneficiary rights Military/Security—using the public communication networks for transfer of classified information of military and/or security nature TPKI encompasses multiple types of activities to which security is vital such as:

Access control—controlling data and resources which specific person(s) or device(s) are entitled to access and/or use under well defined terms Data generation—access control through which a person and/or device is authorized to generate new data (e.g. a Police officer that opens a new criminal record of a suspect)

Data alteration—access control through which a person and/or device is authorized to alter data that already exists (e.g. a Police officer changing the type of charges of a suspect)

Data viewing—access control through which a person and/or device is authorized to view data (e.g. a Police officer entitled to view the criminal record of a person)

Physical access—access control to physical resources or infrastructure such as enabling physical open/closing of gates/doors, enabling activation of control of a plant or weapon system.

Data transfer—ensuring data is transferred pursuant to a certain level of trust, according to agreed policies and technologies, compliant with laws, regulations and local procedures Contracting—establishing, signing, practicing, proving and enforcing contractual relationship.

Agreeing on the legal frame and applicable laws

Negotiating terms

Closing a contract

Acting by the contract

Proving above by set of irrevocable records and thus enforcing a contract by order of court or arbitration.

Transactions

Agreeing on terms of transaction by contractual or other means

Agreeing on the contents of a transaction

Filing (storing) the intermediate operations within a transaction

Time stamping by means of time stamping third party servers or by the time at which a transactional operation or transactional step took place as agreed between the sides Ensuring fulfillment By means of TPKI and by implementing the Engine secured data communications in different fields by different types of activities is made possible while taking full advantage of the Method for Automatic Handling of Certificates and Key-Based Processes.

I claim:

1. A method for administering a global information security infrastructure, the method comprising:
   a. granting at least one unique user ID to each of a plurality of certificate owners;
   b. associating a bin within a repository with each unique user ID, contents of the bin subject to alteration solely by the certificate owner associated with the unique user ID;
   c. allowing a user other than a specified certificate owner to access a subset of contents of the bin associated with the specified certificate owner; and
   d. matching a profile of the user with an attribute vector associated with a certificate of the specified certificate owner.

2. The method of claim 1, wherein the step of associating a bin further comprises providing a global handshake server that acts as the repository.

3. The method of claim 1, wherein the step of associating a bin further comprises providing a plurality of global handshake servers that act as the repository.

4. A method for controlling access to specified data and resources, the method comprising:
   a. granting at least one unique user ID to each of a plurality of certificate owners;
   b. associating a bin within a repository with each unique user ID, contents of the bin subject to alteration solely by the certificate owner associated with the unique user ID;

c. allowing a user other than a specified certificate owner to access a subset of contents of the bin associated with the specified certificate owner;
d. matching a profile of the user with an attribute vector associated with a certificate of the specified certificate owner; and
e. permitting the user to perform a specified function with respect to a specified set of one or more resources.

5. A method according to claim 4, wherein the step of permitting the user to perform a specified function includes permitting the user to generate data to be retained at the specified resource.

6. A method according to claim 4, wherein the step of permitting the user to perform a specified function includes permitting the user to alter data retained at the specified resource.

7. A method according to claim 4, wherein the step of permitting the user to perform a specified function includes permitting the user to view data retained at the specified resource.

8. A method according to claim 4, wherein the step of permitting the user to perform a specified function includes permitting the user to control physical resources.

9. A method according to claim 7, wherein the step of permitting the user to perform a specified function includes permitting the user to control one of a plant or a weapon system.

10. A method according to claim 9, further including preserving a time stamp for one or more steps of the method.

11. A method for establishing a contractual relationship, the method comprising:
a. granting at least one unique user ID to each of a plurality of certificate owners;
b. associating a bin within a repository with each unique user ID, contents of the bin subject to alteration solely by the certificate owner associated with the unique user ID;
c. allowing a user other than a specified certificate owner to access a subset of contents of the bin associated with the specified certificate owner;
d. matching a profile of the user with an attribute vector associated with a certificate of the specified certificate owner in such a manner as to establish concurrence with respect to a legal framework for a contract;
e. providing a protocol for negotiation of contract terms; and
f. storing irrevocable records of agreed terms of the contract.

12. A method for providing authentication of a certificate, the method comprising:
a. granting at least one unique user ID to each of a plurality of certificate owners;
b. associating a bin within a repository with each unique user ID, contents of the bin subject to alteration solely by the certificate owner associated with the unique user ID;
c. allowing the certificate owner to store within the bin one of the certificate and a pointer to the certificate;
d. allowing a user other than a specified certificate owner to access a subset of contents of the bin associated with the specified certificate owner; and
e. matching a profile of the user with an attribute vector associated with a certificate of the specified certificate owner.

* * * * *